UNITED STATES PATENT OFFICE.

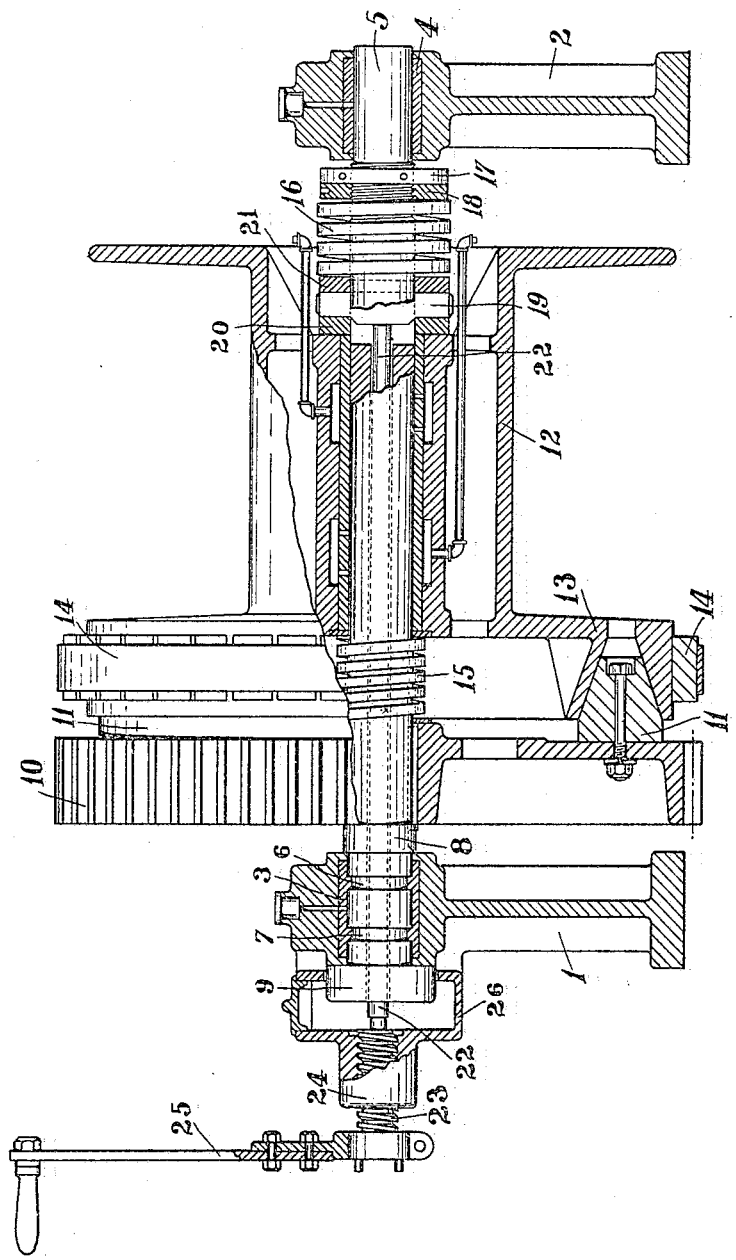

THOMAS SPENCER MILLER, OF SOUTH ORANGE, NEW JERSEY.

ROPE-DRUM.

No. 809,968.　　　　Specification of Letters Patent.　　　　Patented Jan. 16, 1906.

Application filed February 21, 1903. Serial No. 144,465.

*To all whom it may concern:*

Be it known that I, THOMAS SPENCER MILLER, a citizen of the United States, and a resident of South Orange, county of Essex, and State of New Jersey, have invented a new and useful Improvement in Rope-Drums, of which the following is a specification.

The object which has primarily led to the making of my present invention is to eliminate the thrust-pin friction which has heretofore been the source of great annoyance and disadvantages and loss of power in such rope-drum mechanism as that shown, for example, in the Beekman patent, No. 541,308; but now that my invention is made it is manifest to me that it embodies a principle which is susceptible of a broader field of application.

In the accompanying drawing I have shown, partly in section, an elevation of a rope-drum employing my invention.

1 and 2 are stationary end frames carrying the bushings 3 and 4, in which the shaft 5 is journaled. This shaft is held against longitudinal movement by the interior flanges of the bushing 3, which project into corresponding grooves 6 and 7 of the shaft, and by the shoulder 8 of the shaft bearing against the face of the frame 1 and by the collar 9 fixed to the end of the shaft and which bears against the opposite face of the frame 1.

10 is the prime mover of the mechanism shown, which in this case is a spur-wheel driven from any suitable source of power and fixed upon the shaft 5.

11 is the friction-ring, secured to the face of the spur-wheel and preferably composed of sections of wood in the form shown.

12 is the rope-drum, carrying the flange 13 containing the groove which coöperates with the friction-ring 11 to form a friction-clutch. This drum is so mounted upon the shaft 5 as to have freedom of both longitudinal and circumferential movement thereon.

14 is the band-brake, coöperating with the exterior of the drum-flange 13.

15 is a coil-spring interposed between the hubs of the spur-wheel and drum and tending to separate the surfaces of the friction-clutch.

16 is a coil-spring of greater power than the spring 15 and which tends to set the surfaces of the friction-clutch together in antagonism to the spring 15. To this end the spring 16 is preferably mounted between a collar fixed to the shaft 5 and the end of the drum, so that the bearings of the shaft may be relieved of the end thrust. This collar for the purposes of adjustment is preferably made of the two jam-nuts 17 and 18, threaded upon the shaft, as shown.

The mechanism by which the compression of the spring 16 is effected for the purpose of relieving the friction at the clutch, either partially or wholly, is preferably of the following construction: Interposed between the spring 16 and the hub of the drum 12 is a cross-key 19, operating in a slot extending diametrically through the shaft. Friction-washers 20 and 21 are interposed between this cross-key and the drum and spring, respectively. The cross-key is thrust toward the spring 16 for the compression of the same by means of the pin 22, extending through a hole at the center of the shaft and projecting from one end of the shaft in position to be operated by the screw 23, threaded in the nut 24, fixed to the end frame 1. 25 is the usual hand-lever for operating this screw. Since the friction-clutch is set by the power of the spring 16, when the friction of the clutch is at its maximum the pressure of the screw 23 upon the end of the thrust-pin 22 may be entirely relieved, and thus all of the difficulties heretofore encountered because of the friction at the end of the thrust-pin may be entirely avoided. Moreover, the maximum power with which the friction is set may be controlled by the selection of the spring 16 and the adjustment of the collar 17 18, thus enabling the constructor to determine beforehand the maximum power of the friction-clutch, so that the operator is unable to increase the work of the mechanism beyond what it is designed for. Moreover, the engine is most relieved from the friction due to the thrust upon the thrust-pin at the time when the clutch calls upon it to do the maximum work, since the friction due to the thrust upon the thrust-pin occurs only at the time when the friction-ring 11 is partially or wholly unset. When the drum is paying out the rope or lowering a load, the gear and shaft may remain stationary. Hence there is no pin-friction at that time. All of these advantages over the old construction are accomplished without substantially impairing the complete control which the operator has over the clutch within the proper limits of the power of the apparatus.

Although at the most critical time the friction upon the thrust-pin 22 is eliminated in the operation of this apparatus, nevertheless such friction at less critical times will be present—as, for example, while the clutch is being set or unset or if it be run in a partially-unset condition. To take care of this friction, I prefer still to employ a lubricating-box 26, similar to that described in the Beekman patent, No. 541,308, for containing a lubricant to immerse the bearing-surface between the thrust-pin 22 and screw 24.

The devices which respectively tend to set and unset the friction are not necessarily springs, and the mechanism whereby the relative power exerted by said devices is controlled does not necessarily contain a thrust-pin and is not necessarily operated from the end of the shaft.

Having thus fully described my invention, I claim as new and desire to secure by Letters Patent—

1. In combination, a revolving shaft, a driving member revolubly fixed thereon, a rope-drum revolubly loose thereon, an interposed clutch, automatically-operating mechanism revolving with the shaft whereby said clutch is set and manually-controlled mechanism whereby the same is unset.

2. In combination, a revolving shaft, a driving member revolubly fixed thereon, a rope-drum revolubly loose thereon, an interposed clutch, a clutch-setting motor revolving with the shaft and a clutch-unsetting actuator having stationary bearings.

3. In combination, a revolving shaft, a driving member revolubly fixed thereon, a rope-drum revolubly loose thereon, an interposed clutch, a clutch-setting motor revolving with the shaft and a manually-controlled mechanism whereby the clutch is unset.

4. In combination, the shaft, the driving member and rope-drum thereon, the interposed friction members, automatically-operating mechanism whereby said friction members are set and a thrust-pin in said shaft coöperating with said automatic mechanism.

5. In combination, the shaft, the driving member and rope-drum thereon, an interposed clutch, automatically-operating mechanism whereby said clutch is set and manually-controlled mechanism having a longitudinal movement on the shaft whereby the clutch is unset.

6. In combination, the shaft, the driving member, and rope-drum thereon, the interposed friction members, a spring interposed between the driving member and the drum tending to unset said friction members, a more powerful spring at the opposite end of said drum tending to set said friction members and mechanism whereby the pressure of the latter spring is controlled.

7. In combination, a driving and driven members, the interposed friction members, mechanism tending to set said friction members, mechanism tending to unset said friction members and means whereby the relative power exerted by said mechanisms may be controlled for the setting or unsetting of said friction members.

8. In combination, a revolving shaft, a driving member revolubly fixed thereon, a rope-drum revolubly loose thereon, an interposed clutch, automatically-operating mechanism whereby said clutch is set, means whereby the power of said mechanism is adjusted and manually-controlled mechanism whereby said clutch is unset.

9. In combination, a revolving shaft, a driving member revolubly fixed thereon, a rope-drum revolubly loose thereon, a clutch interposed between the drum and the driving member, a thrust-bearing carried by the shaft, automatically-operating mechanism for setting said clutch interposed between the thrust-bearing and the drum, and means whereby the power on said mechanism is adjusted and controlled.

10. In combination, a shaft, a driving member thereon, a rope-drum, an interposed clutch, a clutch-setting motor revolving with the drum and a manually-operated device extending through said driving member whereby said clutch is unset.

11. In combination, a revolving shaft, a driving member revolubly fixed thereon, a rope-drum revolubly loose thereon, an interposed clutch, a clutch-setting motor revolving with the shaft and a thrust-pin concentric with the shaft whereby the clutch is unset.

12. In combination, a longitudinally-fixed shaft, a driving member thereon, a rope-drum, an interposed clutch, an automatically-operating clutch-setting mechanism, a clutch-unsetting actuator having stationary bearings, a connection through which the clutch is unset by the movement of said actuator.

13. A rope-drum, in combination with the following controlling devices, viz: a friction-brake, a friction-clutch, an automatically-operating motor revolving with the drum whereby the clutch is set and a manually-operated device whereby the clutch is unset.

14. A rope-drum, in combination with the following controlling devices, viz: a friction-clutch, a clutch-setting spring having both its thrust-bearings rotating with the drum, and a manually-operated clutch-unsetting mechanism.

In testimony whereof I have hereunto signed my name in the presence of two subscribing witnesses.

THOMAS SPENCER MILLER.

Witnesses:
 WALTER A. PAULING,
 CHAS. C. PIERCE.